United States Patent [19]

Hama et al.

[11] Patent Number: 4,619,287

[45] Date of Patent: Oct. 28, 1986

[54] VALVES PROPER FOR VALVE-TYPE FLUID-FLOW CONTROLLERS

[75] Inventors: Tomio Hama; Kiyoyasu Yamazaki, both of Okaya, Japan

[73] Assignee: Nihon Pisuko Kabushiki Kaisha, Nagano, Japan

[21] Appl. No.: 712,204

[22] Filed: Mar. 15, 1985

Related U.S. Application Data

[63] Continuation of Ser. No. 433,149, Oct. 6, 1982, abandoned.

[51] Int. Cl.⁴ ............................................. F16K 15/14
[52] U.S. Cl. ............................. 137/513.3; 137/512.15; 137/854
[58] Field of Search ................... 137/512.15, 852, 853, 137/854, 513.3, 599; 91/443

[56] References Cited

U.S. PATENT DOCUMENTS

| | | | |
|---|---|---|---|
| 2,630,920 | 3/1953 | Kerr | 137/854 X |
| 2,859,771 | 11/1958 | Blagg | 137/854 X |
| 3,022,796 | 2/1962 | Cummings | 137/854 X |
| 3,473,561 | 10/1969 | Svenson | 137/854 |
| 4,171,007 | 10/1979 | Bouteille | 137/853 X |

FOREIGN PATENT DOCUMENTS

| | | | |
|---|---|---|---|
| 57-97968 | 6/1982 | Japan | 137/852 |
| 344598 | 3/1960 | Switzerland | 137/854 |

*Primary Examiner*—Robert G. Nilson
*Attorney, Agent, or Firm*—Birch, Stewart, Kolasch & Birch

[57] ABSTRACT

Several projected stripes, extending at regular intervals along the direction of fluid flow, are provided over the entire outer surface of a conical diaphragm except its outermost edge and neighboring section, and this diaphragm is set in a fluid-flow path with its outermost edge in tight contact with the wall of the fluid-flow path. The set of projected stripes not only arranges uniform flow of fluid but also prevents the diaphragm from being deformed under the fluid pressure.

3 Claims, 5 Drawing Figures

VALVES PROPER FOR VALVE-TYPE FLUID-FLOW CONTROLLERS

This application is a continuation of copending application Ser. No. 433,149, filed on Oct. 6, 1982, now abandoned.

DESCRIPTION OF THE PRIOR ART

FIG. 1 shows a rough sectional view of the valve proper for conventional valve-type fluid-flow controllers. A diaphragm 50 is, in the form of a cone and includes an outermost edge held in contact with the wall of the fluid-flow path. A push nut 51 supports the diaphragm (50), which is in elastic contact with the wall of the fluid-flow path and which has the fluid-flow opening (52) provided therein. A needle 53 includes a tapered tip which is capable of going in and coming out of the central hole (54) through both the diaphragm and push nut. When the fluid is to flow in the direction indicated by the arrow A, the diaphragm (50) is opened outwardly, bringing its outermost edge into contact with the wall of the fluid-flow path and thus we have a controlled flow through the central hole (54) in proportion to the degree of insertion of the needle (53). On the other hand, when the fluid is to flow in the direction indicated by the arrow B, the diaphragm (50) is caused to contact inwardly, giving rise to a wide gap between the diaphragm and the wall of the fluid-flow path and thus we have a free flow of fluid.

Such a conventional structure has disadvantages as follows: In the case of flow in the A-arrowed direction, a rise in fluid pressure will increase deformation of the diaphragm (50) between its intermediate section and the outermost edge, until there appears a gap between the outermost edge and the wall of the fluid-flow path so that the fluid is caused to leak through, thus bringing the fluid flow out of planned control; to make the matter worse, this deformation will cause the diaphragm material to be fatigued. On the other hand, in the case of a flow in the B-arrowed direction, the section of the outer edge of diaphragm (50) which is mechanically weak is first caused to contract with a resultant gap on the wall of the fluid-flow path, and thus the fluid is compelled to flow unevenly through this gap, with reslutant disturbed flow.

SUMMARY OF THE INVENTION

The major object of the present invention is to provide the outer surface of the diaphragm with projected stripes in order to offer those valves proper valve-type fluid-flow controllers which are not only protected from being deformed but are also capable of controlling the fluid flow uniformly.

Another important object of the present invention is to put the outermost edge faces in contact with the wall of the fluid-flow path in order to offer those valves proper valve-type fluid-flow controllers which are capable of controlling the fluid flow uniformly with promoted preventive performance against the deformation of the diaphragm.

Another object of the present invention is to provide projected stripes on a cap which is to be put in contact with the diaphragm in order to offer those valves proper valve-type fluid-flow controllers which are capable of being set to adjustable strengths.

The final object of the present invention is to have a needle capable of projecting into and out of a hole, to any controlled depth, which is formed in the axial direction of the diaphragm provided with projected stripes on its outer surface, in order to offer those valves proper valve-type fluid-flow controllers which are capable of arranging controlled flows.

SPECIFICATION OF THE INVENTION

Figure 1:
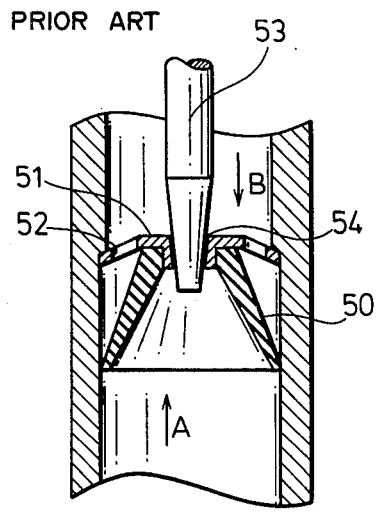
FIG. 1 shows a rough sectional view of the valve proper for conventional valve-type fluid-flow controllers.
Figure 2:
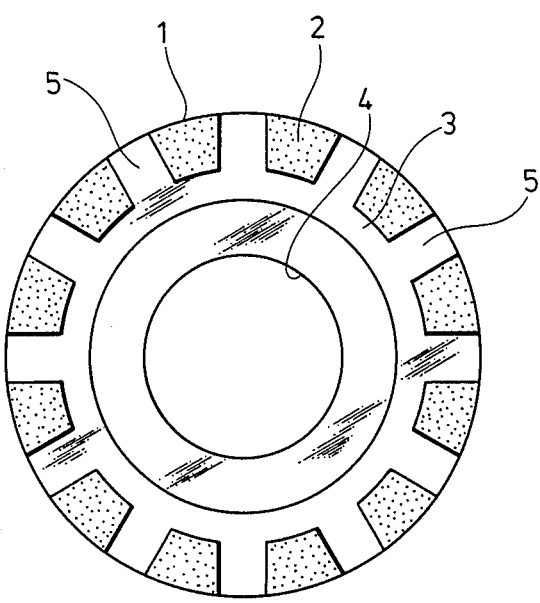
FIG. 2 shows a plan of a valve proper relating to the present invention.
Figure 3:
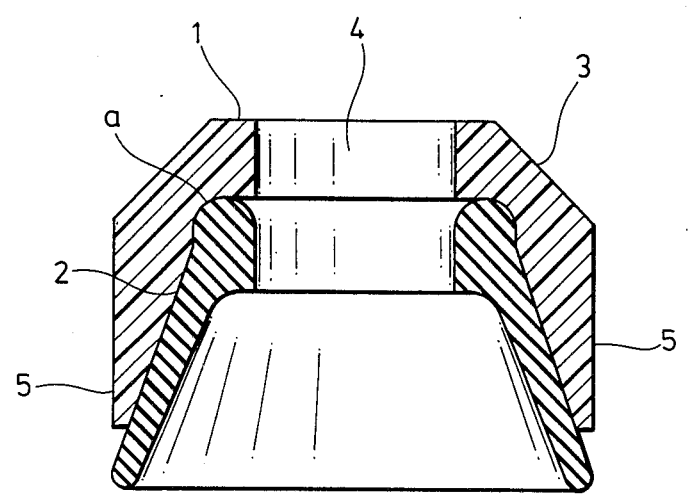
FIG. 3 shows a sectional view for the central, vertical section of the same valve.
Figure 4:
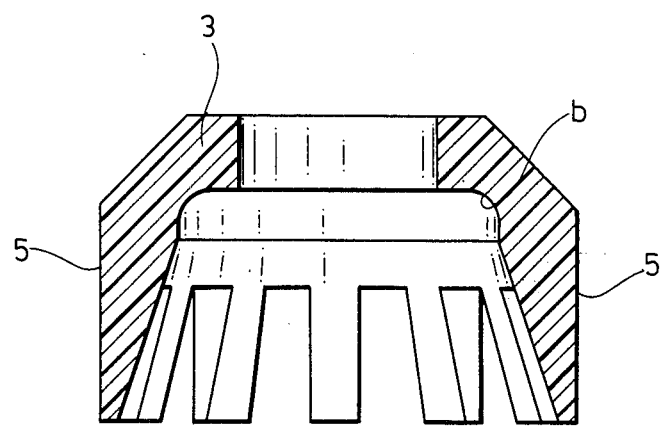
FIG. 4 shows a sectional view for the central, vertical section of a cap part.

FIG. 2 shows a plan view of a valve proper 1, which consists of diaphragm 2 and cap part 3 attached to diaphragm 2 and which has a hole 4 provided centrally through the axis line. FIG. 3 shows a sectional view for the central, vertical section of valve proper 1. As is evident from FIG. 3, diaphragm 2 is made of synthetic rubber in the form of a cone and the diameter for the outermost edge is such that valve proper 1 is, at this outermost edge, in contact with the wall of fluid-flow path on which valve proper 1 is to be provided. Diaphragm 2 has near its minimum-diameter part the or projecting edge (a) formed with a thicker wall; this projected edge (a) is caught by the dent (b) provided on cap part 3 with resulting support of diaphragm 2 on cap part 3. Cap part 3 is provided with 12 projected stripes 5 which are designed not to reach the outermost edge of the diaphragm when the cap part has been applied on diaphragm 2. The inner surface of these projected stripes 5 is in contact with the outer surface of the diaphragm so as to withstand the fluid pressure exerted on diaphragm 2. The outer faces of the projected stripes 5 are extended along the axis line in the diameter direction so as to be in contact with the wall of fluid-flow path. Cap part 3 is made of a material, capable of withstanding the fluid pressure to be exerted one diaphragm 2, such as synthetic resin or hard rubber.

Figure 5A:
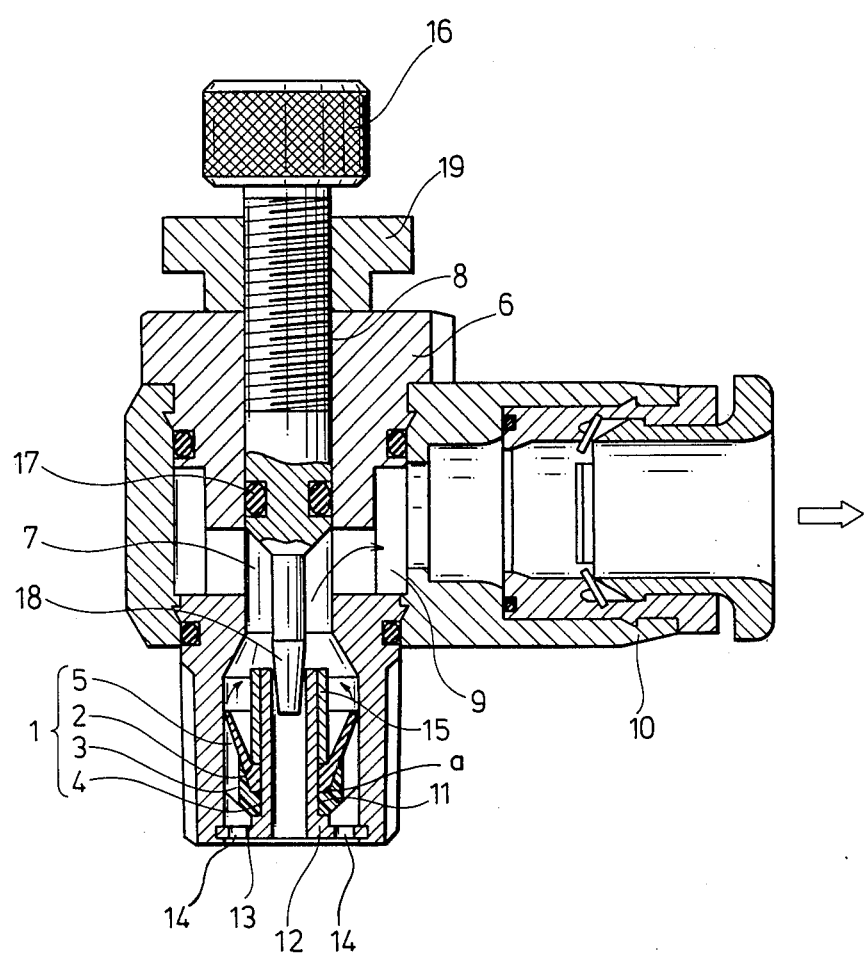
FIG. 5(a) shows a sectional view of an air-pressure controller with a valve proper relating to the present invention corresponding to the case of free flow and FIG. 5(b) shows a sectional view of an air-pressure controller with a valve proper relating to the present invention corresponding to a controlled flow.

Account will be made below of an air-pressure controller which utilizes the valve proper 1 with the above-described structure. In FIG. 5(a) a controller proper 6 is in the form of an approximate cylinder, its penetrating hole portion constitutes the flow path 7, and the female screw part 8 is provided on the wall above the flow path 7; the female screw part 8 has at its middle part the communicating path 9 extended toward the outer circular face and expanded in diameter at its lower part. A pipe joint 10 is fixed on the controller proper 6 so s to be connected at the penetrating hole section to the communicating path 9. A roughly cylindrical sleeve support piece which is fastened at collar 12 onto the lower-end inner wall of the controller proper so as to be positioned at the expanded-diameter section of the flow path 7; this support piece 11 has its axis line coinciding with the axis line of the controller proper 6. Collar support 12 has a step part 13 formed and also has six holes (only two shown in the figure) provided which serve to connect the flow path 7 to a flow path (not shown in the figure) provided outside the controller proper 6. The upper plane of cap part 3 is held in contact with the upper plane of step part 13 so that diaphragm 2 may be opened toward the collar-catching part 12. Such structure will bring valve proper 1 into tight contact with support 11 and prevent it from being disengaged by means of fixing ring 15 fastened at its upper end. Valve proper 1 is in contact with the wall of flow path 7 at both the outer edge of diaphragm 2 and the outer sides of projected stripes 5 of cap parts 3. An adjusting screw 16 is provided on the female screw part 8 and the circular groove formed at its lower part contains O-ring 17. A needle 18, with its axis line coinciding with that of support 11, includes a tapered circular plane extending from the lower end of the adjusting screw 16. The tip of needle 18 may be put into the collar-catching part 12 to any controllable depth by rotating the adjusting screw 16. A lock nut 19 is provided for adjusting screw 16.

Figure 5B:
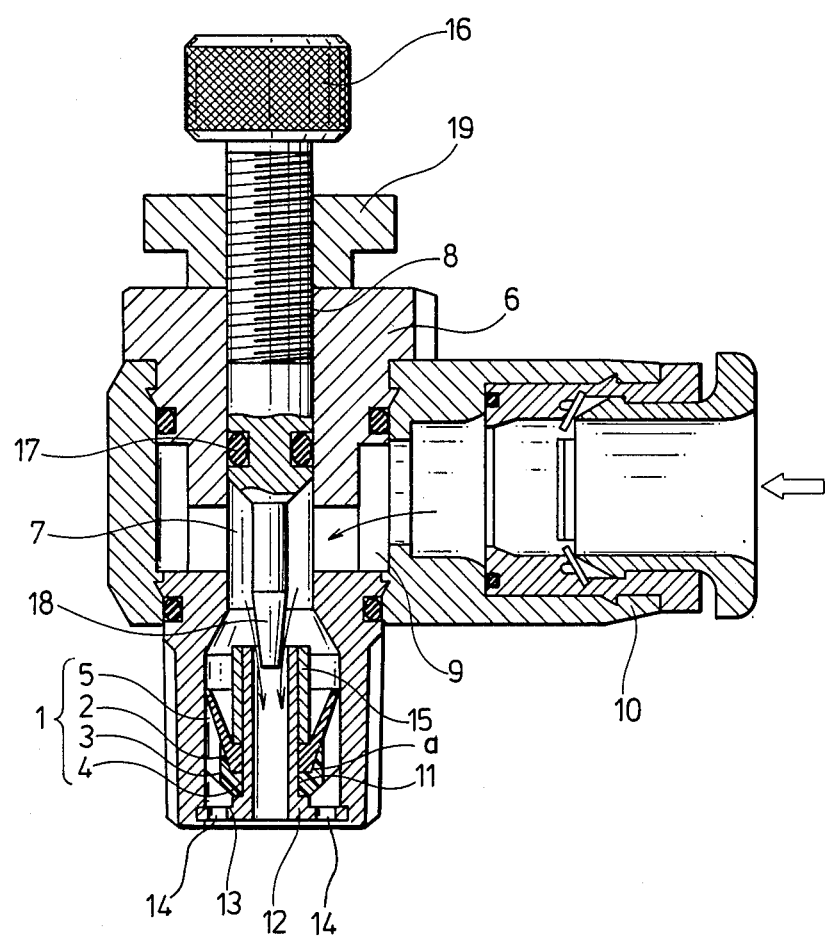

Next, account will be made below of the action of the air-pressure controller. When air is to flow in the direction indicated by the arrow in FIG. 5(a), diaphragm 2 is caused to contract to form a wide gap on the wall of flow path 7; thus, the air flowing through each hole 14 into flow path 7 will be allowed to flow freely from communicating path 9 to pipe joint 10. In this case, the set of projected stripes 5 makes the air flow uniform and keeps uniform the gap between the diaphragm and the wall of flow path 7. On the other hand, when air is to flow in the direction indicated by the arrow in FIG. 5(b), the cone of diaphram 2 is caused to expand until the outermost edge and neighboring section of diaphragm 2, not reinforced by projected stripes 5, are brought into pressurized contact with the wall of flow path 7. With diaphragm 2 under such a pressure, the air is allowed to flow in flow path 7 from communicating path 9 toward each hole 14 in a controlled flow, the flow rate being in proportion to the width of the gap between needle 18 positioned to a certain prescribed depth and the inner wall of support 11 into which needle 18 enters. During this process the air pressure exerted on diaphragm 2 is received by projected stripes 5 on cap part 3 and therefore diaphragm 2 itself need not withstand the air pressure.

It is, of course, possible to reverse valve proper 1 in order to reverse the direction of the air flow adopted in the above example application. In this case, collar 12 on support 11 need not be provided with step 13, but it is necessary to provide a fixing ring pushing the upper plane of cap part 3 in addition to fixing ring 15 pushing up diaphragm 2; thus, valve proper 1 is held between a pair of fixing rings under pressure. Valve proper 1 may be used not only as a controlling valve for any other fluids than air but also simply as a check valve. In the case of the use as a check valve, the structure for supporting valve proper 1 may require hole 4 to be blocked and diaphragm 2 may be provided with projected stripes 5 in a unified unit.

As described above, the valve proper for the valve-type fluid-flow controllers relating to the present invention has a set of several projected stripes extending in the direction of fluid flow provided on the outer surface of the diaphragm. This provision of projected stripes, effective for receiving the fluid pressure, may prevent the deformation on the section ranging from the middle to outermost edge of the diaphragm, resulting in reduction of the degree of fatigue due to the deformation. While the valve is in use for free flow, the projected stripes help arrange uniform flow so as to allow the diaphragm to contract uniformly. A more effective prevention of the diaphragm deformation may be effected by having the outer sides of projected stripes brought in contact with the flow-path wall. A further more effective prevention of the diaphragm deformation may be effected by having the projected stripes on the cap part separately from the diaphragm, since the projected stripes may be made of any material with any strength independently of the diaphragm which requires elasticity. Backed up by the preventive effect of the projected stripes on the deformation, the setting of the needle to any adjustable depths may arrange exactly controlled flows.

We claim:

1. A valve for valve-type fluid flow controllers for providing a fluid flow path to permit the flow of fluid in a first direction and for providing a controlled flow in the reverse direction comprising:
   a flow bore;
   a substantially conical diaphragm constructed of an elastic material and having a predetermined height, said substantially conical diaphragm being operatively positioned with said flow bore;
   said diaphragm including a minimum diameter portion having an aperture formed therein;
   a cap member for mounting on said minimum diameter portion of said diaphragm;
   a plurality of stripes extending from said cap member and engaging an outer surface of said diaphragm, said stripes extending along said diaphragm for a predetermined distance which is less than the predetermined height of said diaphragm;
   said cap member including an aperture formed therein for aligning with said aperture in said diaphragm;
   a collar support traversing said flow bore and having apertures therein;
   a sleeve support affixed to said collar support and extending axially within said flow bore, said sleeve support including an aperture formed therein for aligning with said apertures in said diaphragm and cap member;
   a fixing ring for retaining said diaphragm and cap member on said sleeve support in an operative position wherein said diaphragm is seated within said flow bore;
   a tapered needle movably mounted for insertion into said aligned apertures in said sleeve support, said diaphragm and said cap for controlling the flow of fluid therethrough;
   wherein fluid flowing in a first direction biases said diaphragm in a first direction to permit free flow of fluid through said flow bore and fluid flowing in a reverse direction biases said diaphragm in a reverse direction to permit controlled flow of fluid past said tapered needle.

2. A valve according to claim 1, wherein said minimum diameter portion of said diaphragm includes a projecting edge for affixing said diaphragm to said cap.

3. A valve according to claim 1, wherein said cap is constructed of a synthetic resin material.

* * * * *